United States Patent
Haynes

[11] Patent Number: 5,836,333
[45] Date of Patent: Nov. 17, 1998

[54] CLICKER FAUCET

[76] Inventor: Kenneth B. Haynes, 5215 3rd Ave., W., Bradenton, Fla. 34209

[21] Appl. No.: 720,404

[22] Filed: Sep. 27, 1996

[51] Int. Cl.⁶ .................................................. F16K 37/00
[52] U.S. Cl. ................................ 137/1; 137/556; 251/96; 251/297
[58] Field of Search ................................ 137/556, 556.3, 137/551.552, 1; 251/297, 96; 16/122, DIG. 24, DIG. 30

[56] References Cited

U.S. PATENT DOCUMENTS

| | | | |
|---|---|---|---|
| Re. 23,527 | 7/1952 | Downing et al. | 137/556 |
| 1,341,260 | 5/1920 | Cheek | 251/115 X |
| 2,019,007 | 10/1935 | Guhl | 251/96 |
| 2,613,906 | 10/1952 | Weimar | 137/556 |
| 2,698,731 | 1/1955 | Koehler et al. | 251/297 X |
| 2,758,610 | 8/1956 | Hively | 251/297 X |
| 2,784,934 | 3/1957 | Paulius, Jr. et al. | 251/297 X |
| 3,332,439 | 7/1967 | Burke | 137/556 |
| 4,235,258 | 11/1980 | Uno et al. | 137/556 |
| 4,742,848 | 5/1988 | Black | 251/297 X |
| 5,048,792 | 9/1991 | Fischer | 251/297 |

FOREIGN PATENT DOCUMENTS 527132  3/1940  United Kingdom ..................... 251/96

*Primary Examiner*—John Rivell
*Attorney, Agent, or Firm*—Dorothy S. Morse

[57] ABSTRACT

A faucet handle assembly, and a method for blocking inadvertent rotation of the faucet handle, the assembly being configured to which incrementally allow pre-established uniform amounts of hot and cold water to flow into a faucet, the back of the faucet handle being configured to interact with the non-flat front portion of a clicker mechanism so as to produce a clicking sensation as each incremental volume of water is added to the water stream emanating from the faucet, the clicking sensation allowing a person attempting to adjust the temperature and flow rate of the water stream to easily repeat faucet handle settings previously found to be desirable. It is contemplated for the clicking sensation to be both audible and tactile. A hinged post assembly safety feature is also contemplated to prevent further rotation of the handle once a desired temperature setting is reached. Applications may include, but are not limited to, use in residences and hotels, by children, the elderly, and those having visual impairment to allow them to quickly and easily set the flow rate and temperature of water coming out of a faucet.

15 Claims, 2 Drawing Sheets

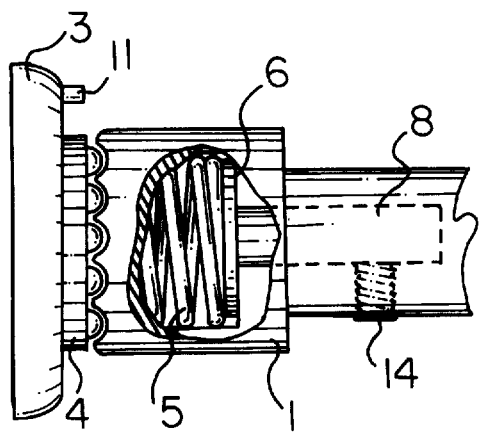
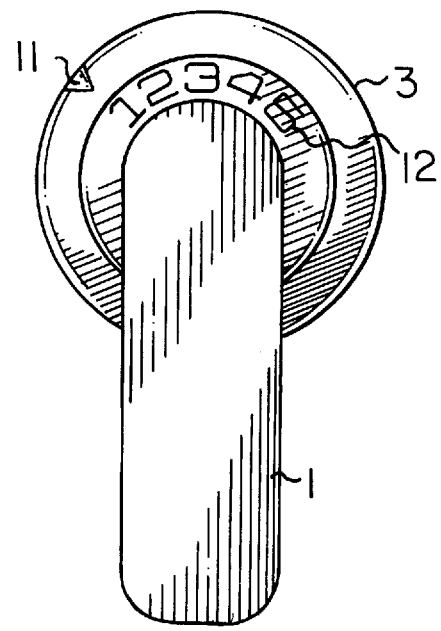
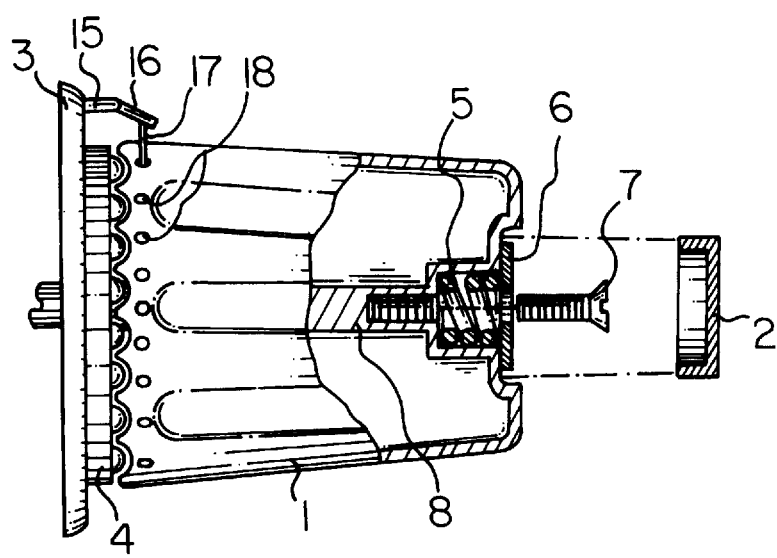

CLICKER FAUCET

BACKGROUND—FIELD OF INVENTION

This invention relates to plumbing fixtures, specifically to faucet handle assemblies used for controlling mixing valves which add hot and cold water to a sink faucet, a bathtub faucet, or a shower head, and a method for blocking inadvertent rotation of each faucet handle assembly, the faucet handle assemblies being configured to incrementally allow pre-established uniform amounts of hot and cold water to flow into an associated faucet or shower head, the back of each handle configured to interact with the front portion of an independent cover plate so as to produce an audible clicking sound and a tactile sensation as each incremental volume of water is added to the water stream emanating from the faucet or shower head, the audible and tactile clicking sensations allowing a person attempting to adjust the temperature and flow rate of the water stream to easily repeat handle assembly settings found previously to be desirable, and the the faucet handle assembly also having a hinged post assembly for use in selectively blocking inadvertent rotation of the faucet handle. Applications may include, but are not limited to, use in residences and hotels, by children, the elderly, and those having visual impairment to allow them to quickly and easily set the flow rate and temperature of water coming out of a faucet.

BACKGROUND—DESCRIPTION OF PRIOR ART

Many people find it difficult to optically adjust the flow rate and temperature of water coming out of a faucet. This particularly applies to the adjustment of water exiting a shower head. When the desired water flow rate is obtained, often the temperature of the water exiting a shower head is not satisfactory and requires additional adjustment. Also, in reverse, when bathers have set the temperature of the water flowing from the shower head within an acceptable range, often the flow rate is not at an optimum level for their needs and requires further adjustment. The time delay for hot water from a water heater to reach a faucet or shower head can complicate this trial-and-error process when the hot water suddenly makes the water stream too warm. People setting water flow and temperature exiting a shower head or faucet typically use their prior experience with the particular faucet to guide their initial handle settings, then they finely adjust the desired water flow and temperature by a trial-and-error process. Children, the elderly, and people with visual impairment have a particularly difficult time in adjusting water temperature to a comfortable level for use by a trial-and-error process. Also, changing pressure in the water lines attached to the faucet or shower head can affect both the flow rate and temperature of the resulting water stream and often creates a need for further adjustment of water flow and temperature after the initial adjustments are made. The audible and tactile clicking sensations of the present invention would also make such further adjustment easier for any bather.

Water flow from hot and cold water pipes into a faucet or shower head in residences and hotels is typically controlled by either one or two faucet handles. The resulting temperature of the water stream exiting the faucet or shower head is dependent upon the respective volume of water allowed to flow from the hot and cold water pipes connected to the faucet and shower head. Faucet controls comprising two handles typically use one handle to control the volume of hot water flowing into the faucet and the other handle to control the volume of cold water flowing into the faucet. Using the two handles, many combinations of water flow settings are possible to create a water stream having a desired temperature, with each combination producing a water stream with a different flow rate. A trial-and-error process of adding non-uniform quantities of hot and cold water to the water stream is required to obtain the desired combination of water flow and temperature.

There are several types of single handles which are used to control the flow rates of hot and cold water through a faucet or shower head. One such handle commonly used with sink faucets is movable in many radial directions from its off position. When it is moved in upward and downward directions, it controls the water stream's flow rate, the downwardmost position being its off position. When such a handle is moved laterally in arcs from its off position to the left and to the right, the handle controls the mix of hot and cold water flowing into the faucet to adjust the temperature of the resulting water stream. Another single handle mixing valve control is known to be used by some hotels to control the flow rates of hot and cold water through a faucet or shower head and has a rotatable handle which moves in an arc from a laterally positioned off setting, through warm water positions of increasingly warmer temperatures, to a fully opened position which represents its maximum hot water temperature setting. Such faucet handles usually do not control the flow rate of the water emanating from the faucet, which seems to remain constant as the handle is moved toward a desired temperature setting. Unless one is familiar with the particular faucet being used, the adjustment of the temperature emanating from the faucet or shower head is also a trial-and-error process of adding non-uniform quantities of hot to the water stream to progressively obtain the water temperature desired. Having a control handle which would incrementally add pre-determined amounts of hot and cold water to a faucet or shower head would make water temperature adjustment faster. It would also make water temperature adjustment safer in that it would lessen the risk of scalding both young and elderly bathers. Having a means for selectively blocking the inadvertent rotation of the faucet handle during water use would also lessen the risk of scalding both young and elderly bathers. The present invention, by use of a mechanism providing an audible and tactile clicking sensation, allows precise incremental adjustment of water flow by adding pre-established uniform amounts of either hot or cold water into a water stream emanating from a faucet or shower head each time the handle is caused to make another clicking water-adjusting movement and its hinged post assembly can selectively block inadvertent and unwanted further rotation of the faucet handle during water use. Therefore, the present invention can be used in the form of a single-handle mixing valve control or a dual handle mixing valve control to easily and precisely incrementally increase and decrease the temperature of a water stream emanating from the faucet to which it is attached.

SUMMARY OF INVENTION—OBJECTS AND ADVANTAGES

It is the primary object of this invention to provide a faucet handle which allows precise increases and decreases in water flow from the faucet to which it is attached. It is also an object of this invention to provide a faucet handle which causes a clicker sensation for each incremental increase or decrease in water volume flowing through the attached faucet, the clicker sensation is intended to be both audible and tactile. A further object of this invention is to provide a faucet handle which is easy to use. It is also an object of this invention to provide a faucet handle which has visual markings, such as numbers, thereon for use in addition to the clicker sensation for adjusting the temperature of water flowing from the faucet to which it is attached. A further object of this invention is to provide a faucet handle which has safety apparatus for optional use to prevent further rotation of the faucet handle once the desired temperature is reached.

As described herein, properly manufactured, and installed, the present invention would provide a means by which the temperature of water emanating from a faucet could be easily and quickly adjusted. Visual markings, such as numbers, placed upon the outer perimeter of each handle used, in addition to the clicking sensation provided by the operating mechanism of the present invention, help a person using the present invention to precisely increase or decrease the temperature of water emanating from the faucet to which it is attached. It is contemplated for the clicking sensation to be both audible and tactile. It is also contemplated for the present invention to comprise a safety feature which prevents further rotation of the faucet handle once the desired temperature is achieved to prevent scalding of children, the infirm, and the elderly.

The description herein provides preferred embodiments of the present invention but should not be construed as limiting the scope of the clicker faucet invention. For example, variations in the number and type of markings used, the configuration of any indicator used, the size and configuration of the cover plate, the cross-sectional configuration of the handle, and the height of each handle, other than those shown and described herein, may be incorporated into the present invention. Thus the scope of the present invention should be determined by the appended claims and their legal equivalents, rather than the examples given.

BRIEF DESCRIPTION OF THE DRAWINGS

FIG. 4 is a side view of a second embodiment of the invention.

FIG. 5 is a front view of the second embodiment of the invention.

FIG. 6 is a side view of a third embodiment of the invention which comprises an additional safety feature to prevent the faucet handle from further rotation once a desired temperature setting is reached.

DETAILED DESCRIPTION OF PREFERRED EMBODIMENTS

Figure 1:
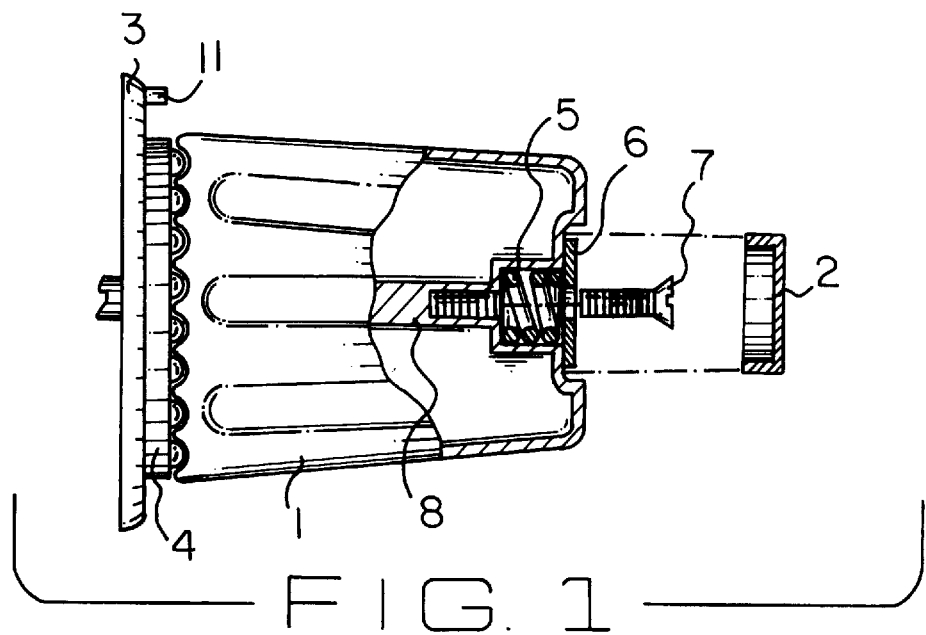
FIG. 1 is a side view of a first embodiment of the invention.

FIG. 1 shows a first preferred embodiment of the present invention having a handle 1, a cap 2, a cover plate 3, a clicker mechanism 4, a spring 5, a washer 6, and valve stem fastener 7. Handle 1 is shown to have a centrally positioned hollow interior portion. It is contemplated for all three of the preferred embodiments of present invention to be used with a rotatable valve stem 8 that is connected to a water control valve (not shown). In the first embodiment it is contemplated for handle 1 to have a substantially cylindrical configuration. Although not shown, cover plate 3 is positioned against a wall or a sink top during use and a central opening through cover plate 3 permits valve stem 8 to be inserted therethrough. FIG. 1 shows indicator 11 positioned on the surface of cover plate 3 which is remote from the wall (not shown). In addition, FIG. 1 shows clicker mechanism 4 having a flat surface and a non-flat surface opposed to the flat surface, with clicker mechanism 4 positioned so that its flat surface is adjacent to cover plate 3. The non-flat surface of clicker mechanism 4 is shown to have uniformly spaced and configured protrusions adjacent to its perimeter which are separated by uniformly spaced and configured depressions therebetween. Clicker mechanism 4 also has a centrally located aperture, shown in FIG. 3 as number 10, for insertion therethrough of valve stem 8. FIG. 1 also shows valve stem 8 being axially positioned within the hollow interior of handle 1 with a spring 5 positioned between the distal end of valve stem 8 and the top interior surface of handle 1. Although not shown, it is contemplated for handle 1 to have a center hole through its top surface, for connection therethrough of valve stem fastener 7 to valve stem 8. A washer 6 is shown connected between valve stem fastener 7 and the outside surface of handle 1. Additionally, FIG. 1 shows a cap 2 configured to snap-fit into a recess in the top surface of handle 1 for covering valve stem fastener 7. The use of cap 2 is not critical to the present invention. Handle 1 is fixedly attached to the end of valve stem 8, so that rotation of handle 1 also rotates valve stem 8 to open and close a water control valve (not shown). The bottom surface of handle 1 is configured to complement the configuration of the non-flat surface of clicker mechanism 4 so that as handle 1 is rotated relative to stationary clicker mechanism 4, a clicking sensation is produced which is both audible and tactile. In the preferred embodiment, as each clicking sensation is felt or heard, one pre-established uniform amount of water is added or subtracted from the flow of water (not shown) emanating from a faucet (not shown) attached to the present invention.

Figure 2:
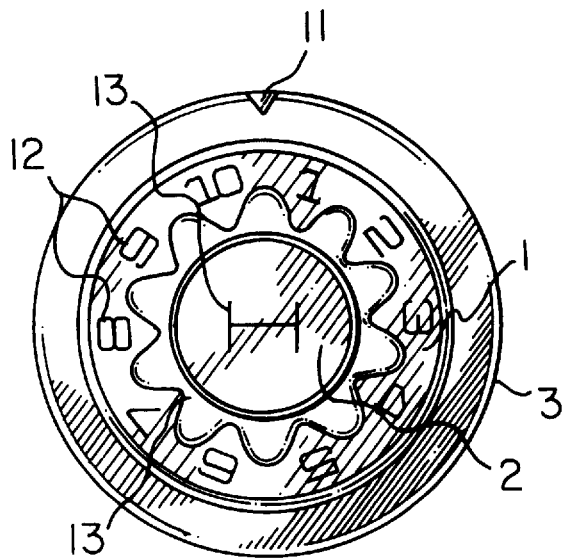
FIG. 2 is a front view of the first embodiment of the invention.

FIG. 2 also shows the first embodiment of the present invention having cap 2 attached to the upper outside surface of handle 1 and the lower portion of handle 1 positioned adjacent to cover plate 3. Cap 2 and cover plate 3 are shown to have a circular configuration and handle 1 is also shown to have a circular cross-sectional configuration. In addition, FIG. 2 shows numerical markings 12 positioned on the upper outside surface of handle 1 and decorative markings 13 on both cap 2 and the top surface of handle 1.

Figure 3:
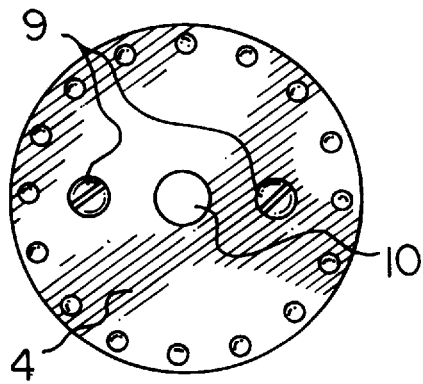
FIG. 3 is a front view of the clicker mechanism used in both the first and second embodiments of the invention.

FIG. 3 shows clicker mechanism 4 having a circular configuration with aperture 10 centrally positioned therethrough. FIG. 3 also shows two fasteners 9 which connect clicker mechanism 4 to both cover plate 3 and the surface (not shown) positioned beneath cover plate 3.

FIG. 4 shows a second preferred embodiment of the present invention. Although not shown in FIG. 4, in the second embodiment it is contemplated for handle 1 to have a substantially L-shaped configuration with a hole on the inside portion of the shorter end of the L-shaped configuration for insertion therethrough of a lock screw 14 to fixedly attach handle 1 to valve stem 8. Also not shown, it is contemplated for cover plate 3 to be positioned against a wall or the top surface of a sink during use and for cover plate 3 to have a central opening to permit valve stem 8 to be inserted therethrough. FIG. 4 shows indicator 11 positioned on the surface of cover plate 3 remote from the wall (not shown). In addition, FIG. 4 shows clicker mechanism 4 having a flat surface and an opposed non-flat surface, with clicker mechanism 4 positioned so than its flat surface is adjacent to cover plate 3. Clicker mechanism 4 also has centrally located aperture 10, for insertion therethrough of valve stem 8. FIG. 4 further shows valve stem 8 being axially positioned within the shorter end of the hollow interior of handle 1 with spring 5 also positioned therein with washer 6 positioned adjacent to the end of spring 5 which is remote from clicker mechanism 4. The use of spring 5 in the second embodiment of the present invention is not critical. Handle 1 in the second embodiment of the present invention is fixedly attached to the end of valve stem 8, so that rotation of handle 1 also rotates valve stem 8 to open and close a water control valve (not shown). The surface of handle 1 positioned against clicker mechanism 4 is configured to complement the configuration of the non-flat surface of clicker mechanism 4 so that as handle 1 is rotated relative to stationary clicker mechanism 4, a clicking sensation is produced. It is contemplated for the clicking sensation to be both audible and tactile. In the second preferred embodiment, as each clicking sensation is felt or heard, one pre-established uniform amount of water is added or subtracted from the flow of water (not shown) emanating from a faucet (not shown) attached to the present invention.

FIG. 5 also shows the second embodiment of the present invention having handle 1 positioned in front of cover plate 3. In addition, FIG. 5 shows handle 1 having numerical markings 2 thereon and indicator 11 positioned in front of cover plate 3.

FIG. 6 shows a third preferred embodiment of the present invention, similar to the first embodiment shown in FIG. 1, having a handle 1, a cap 2, a cover plate 3, a clicker mechanism 4, a spring 5, a washer 6, and valve stem fastener 7. FIG. 3 also shows handle 1 positioned over rotatable valve stem 8. In addition, FIG. 3 shows the present invention having an additional safety feature comprising a hinge 15, a plate 16, a post 17, and holes 18. Hinge 15 rotatably connects one end of plate 16 to cover plate 3. Also, a plurality of holes 18 are positioned through handle 1 near to its lower edge, each hole having sufficient size for insertion therethrough of post 17, the present invention also comprising one hole 18 for each clicking increment provided, so that as clicking mechanism 4 is moved, one hole 18 lines up with the position of post 17. Thus, a user may adjust hinge 15 and plate 16 to force post 17 into the adjacent hole 18 to block further rotation of handle 1, until post 17 is again removed from hole 18. It is contemplated for one use of the third embodiment of the present invention to be the insertion of post 17 into holes 18 to prevent curious children (not shown) wanting to hear the clicking sounds produced by clicker mechanism 4 from rotating handle 1 and scalding themselves. Although not shown, it is also contemplated for post 17, holes 18, plate 16 and hinge 15 to be used with the second embodiment of the present invention to prevent further rotation of handle 1 once a desired temperature setting is reached.

The materials from which the present invention is made are not critical to the present invention. However, it is contemplated for the complementary configured surfaces of the non-flat surface of clicker mechanism 4 and the bottom surface of handle 4 to be made from durable materials which resist wear from rotation of one against the other. In the preferred embodiments it is contemplated for the present invention to be made from plastic materials or stainless steel. Also, in the preferred embodiments, handle 1 may be made from a wide variety of materials to include plastic, stainless steel, wood, brass, gold, crystal, and the like. Further, in addition to the cylindrical shape of handle 1 in the first embodiment shown in FIG. 1 and the L-shaped configuration of handle 1 in the second embodiment shown in FIGS. 4 and 5, it is contemplated for handle 1 to comprise other configurations such as an X shape. Also the height dimension of each handle 1 is not critical to the present invention, nor is the number and type of decorative markings 13 used, the configuration of indicator 11, and the size and configuration of cover plate 3.

To use the present invention, one would first position cover plate 3 against the surface (not shown) to which it is intended for the present invention to be attached so that valve stem 8 extends through the central opening (not shown) in cover plate 3. Fasteners 9 are then used to attach clicker mechanism 4 to the front portion of cover plate 3. Subsequently, handle 1, spring 5, and washer 6 are positioned over valve stem 8 and valve stem fastener 7 is used to connect handle 1 fixedly to valve stem 8 so that rotation of handle 1 will also rotate valve stem 8 to cause increases and decreases in water flow through an attached faucet (not shown). Further, as a safety precaution, post 17 can be inserted into holes 18 to prevent further rotation of handle 1 once a desired temperature setting is achieved.

What is claimed is:

1. A handle assembly for attachment to a water control valve associated with faucets and shower heads which allows incremental pre-established uniform amounts of water to flow into said faucet and said shower head with both an audible and tactile clicking sensation associated each therewith and which allows both pre-established incremental increases and decreases of water flow to correspond with each of said clicking sensations, said handle assembly comprising a clicker mechanism having an essentially planar configuration, a front side, and a back side, with said front side having a perimeter and a non-flat surface comprising a plurality of uniformly spaced and uniformly configured protrusions adjacent to said perimeter;

a handle having a bottom and a top, said bottom of said handle having a plurality of uniformly spaced and uniformly configured indentations therein, said non-flat surface of said front side of said clicker mechanism and said bottom of said handle each being configured to interact with one another to produce a plurality of said audible and tactile clicking sensations when said handle is rotated relative to said clicker mechanism and said bottom of said handle is positioned for contact with said clicker mechanism;

attachment means configured to secure said handle against said clicker mechanism so that said handle is able to rotate relative to said clicker mechanism to produce said audible and tactile clicking sensations; and a plurality of identifying marks positioned on said faucet handle in a manner which allows each of said identifying marks to correspond with an amount of rotation of said handle required to produce one of said audible and tactile clicking sensations, wherein rotation of said handle opens and closes said water control valve, and also causes said protrusions of said non-flat surface on said front of said clicker mechanism and said indentations in said bottom of said handle to move relative to one another wherein movement of said bottom of said handle across one of said protrusions will cause one of said clicking sensations and a corresponding upward or downward adjustment of said water from said water control valve by one of said pre-established incremental amounts.

2. The handle assembly of claim 1 further comprising a cover plate to which said back side of said clicker mechanism is attached.

3. The handle assembly of claim 2 further comprising at least one indicator connected to said cover plate against which said identifying marks on said handle can be rotated until the desired one of said identifying marks is correctly positioned for desired levels of water flow and temperature from said faucet and said shower head.

4. The handle assembly of claim 1 further comprising a number plate having an upper surface positioned adjacent to said handle, and wherein said identifying marks are placed upon said upper surface.

5. The handle assembly of claim 1 wherein said attachment means comprises a plurality of screws, at least one spring, and at least one washer, said spring being centrally connected between said washer and said top of said handle, and said washer centrally attached to said top of said handle by one of said screws.

6. The handle assembly of claim 1 further comprising a cover plate to which said back side of said clicker mechanism is attached, hinging means connected to said cover plate, a plate having one end connected to said hinging means, a post attached to said plate, and a plurality of holes through said handle adjacent to said bottom, said handle having one hole associated with each of said clicking sensations, and said post being configured for insertion within each of said holes for blocking further rotation of said handle when a desired water temperature setting is achieved.

7. The handle assembly of claim 1 further comprising hinging means connected to said cover plate, a plate having one end connected to said hinging means, a post attached to said plate, and a plurality of holes through said handle adjacent to said bottom, said handle having one hole associated with each of said clicking sensations, said post being configured for insertion within each of said holes for blocking further rotation of said handle when a desired water temperature setting is achieved.

8. A handle assembly for attachment to a water control valve associated with faucets and shower heads which allows incremental pre-established uniform amounts of water to flow into said faucet and said shower head with a clicking sensation associated each therewith and which allows both pre-established incremental increases and decreases of water flow to correspond with each of said clicking sensations, said handle assembly comprising a clicker mechanism having a front side and a back side, said front side having a non-flat surface;

a handle having a bottom and a top, said bottom of said handle and said non-flat surface of said front side of said clicker mechanism each being configured to interact with one another to produce a plurality of said clicking sensations when said handle is rotated relative to said clicker mechanism and said bottom of said handle is in contact with said clicker mechanism;

attachment means to secure said handle against said clicker mechanism so that said handle is able to rotate relative to said clicker mechanism to produce said clicking sensations; and a plurality of identifying marks positioned on said faucet handle in a manner which allows each of said identifying marks to correspond with an amount or rotation of said handle required to produce one of said clicking sensations, said handle being securely attached to said water control valve so that rotation of said handle opens and closes said water control valve, said interacting configurations of said non-flat surface of said front of said clicker mechanism and said bottom of said handle being configured to have uniformly spaced protrusions thereon so that movement of said bottom of said handle across one of said protrusions on said non-flat surface of said front of said clicker mechanism causes the occurrence of one of said clicking sensations and the upward and downward adjustment of one of said clicking sensations and the upward and downward adjustment of one of said pre-established incremental amounts of said water from said water control valve;

said handle assembly further comprising a cover plate to which said back side of said clicker mechanism is attached, hinging means connected to said cover plate, a plate having one end connected to said hinging means, a post attached to said plate, and a plurality of holes through said handle adjacent to said bottom, said handle having one hole associated with each of said clicking sensations, and said post being configured for insertion within each of said holes for blocking further rotation of said handle when a desired water temperature setting is achieved.

9. The handle assembly of claim 8 further comprising at least one indicator connected to said cover plate against which said identifying marks on said handle can be rotated until the desired one of said identifying marks is correctly positioned for desired levels of water flow and temperature from said faucet and shower head.

10. The handle assembly of claim 8 further comprising a number plate having an upper surface positioned adjacent to said handle, and wherein said identifying marks are placed upon said upper surface.

11. The handle assembly of claim 8 wherein said attachment means comprises a plurality of screws, at least one spring, and at least one washer, said spring being centrally connected between said washer and said top of said handle, and said washer centrally attached to said top of said handle by one of said screws.

12. A method for controlling the water temperature and flow rate of water exiting from faucets and shower heads and for blocking inadvertent rotation of the faucet handle connected to said faucets and shower heads which is used for adjustment of said exiting water, said method comprising the steps of providing an essentially planar clicker mechanism having a perimeter surface with uniformly spaced and configured protrusions thereon, a handle having a lower surface configuration complementing said non-flat perimeter surface, a hinge, a cover plate, a plate, a post, and a water control valve;

forming a hole centrally in said cover plate;

placing the valve stem of said water control valve through said hole so that said cover plate is axially aligned with said valve stem;

connecting one end of said hinge to said cover plate in a position adjacent to the outside perimeter of said cover plate;

connecting the other end of said hinge to one of the opposite ends of said plate;

connecting the other of said opposite ends of said plate to one end of said post;

positioning said clicker mechanism against said cover plate so that said protrusions face away from said cover plate;

connecting said handle to said valve stem so that said lower surface configuration of said handle interacts with said protrusions of said clicker mechanism to produce audible and tactile clicking sensations when said handle is rotated and which also allows one pre-established incremental increase and decrease of water flow into said faucet and shower head for each one of said clicking sensations produced; and also connecting said handle so that the distal end of said post can be rotated into one of many indentations in the outside surface of said handle to block inadvertent rotation of said handle once a desired water temperature setting is achieved.

13. The method of claim 12 further comprising the steps of providing at least one indicator, connecting said indicator to said cover plate, and placing said indicator into a desired position so that said identifying marks on said handle can be rotated until a desired one of said identifying marks is correctly positioned relative to said indicator for preferred setting of water flow and temperature exiting said faucet and shower head.

14. The method of claim 7 further comprising the steps of providing a number plate, placing said number plate so that its upper surface is positioned adjacent to said handle, and placing identifying marks upon said upper surface.

15. The method of claim 7 wherein said step of providing said attachment means further comprises the steps of providing a plurality of screws, at least one spring, and at least one washer, and further comprising the steps of connecting said spring between said washer and said top of said handle, and said washer centrally attached to said top of said handle by one of said screws.

\* \* \* \* \*